L. WILLIS.
ATTACHMENT FOR POTATO DIGGERS.
APPLICATION FILED SEPT. 9, 1910.

1,015,110.

Patented Jan. 16, 1912.

Witnesses
Harry L. Smith
Hamilton S. Turner

Inventor
Leland Willis
by his attorney
Harry Smith

L. WILLIS.
ATTACHMENT FOR POTATO DIGGERS.
APPLICATION FILED SEPT. 9, 1910.

1,015,110.

Patented Jan. 16, 1912.
2 SHEETS—SHEET 2.

Witnesses
Harry L. Smith
Hamilton J. Turner

Inventor
Leland Willis
by his Attorney
Harry Smith

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

ATTACHMENT FOR POTATO-DIGGERS.

1,015,110.   Specification of Letters Patent.   Patented Jan. 16, 1912.

Application filed September 9, 1910. Serial No. 581,307.

*To all whom it may concern:*

Be it known that I, LELAND WILLIS, a citizen of the United States, residing in Grenloch, New Jersey, have invented certain Improvements in Attachments for Potato-Diggers, of which the following is a specification.

My invention consists of an improvement in that type of potato digging machines in which the potatoes and vines are carried rearwardly from the digging mechanism upon a conveyer consisting of a plurality of transverse rows of rotating disks. Such a machine is shown, for instance, in the patent of Robbins, No. 771,800, dated October 4, 1904.

The object of my invention is to provide means whereby the user of the machine may readily increase or decrease the number of rows of disks in order to best adapt the machine to the proper handling of the particular crop which is being harvested. This object I attain by providing an attachment which can be readily connected to the frame of the machine, the attachment carrying any desired number of additional transverse rows of disks and provision for rotating the same and being also provided with a supplementary pusher bar or kicker and means for operating the same, whereby the backward passage of the vines over the rows of disks carried by the attachment is facilitated.

Figure 1:
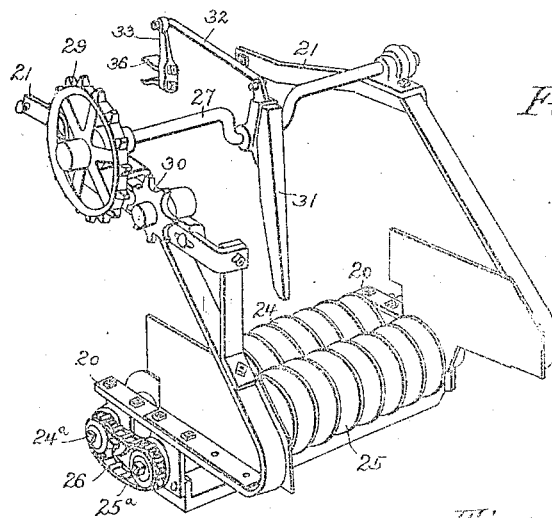
Figure 4:
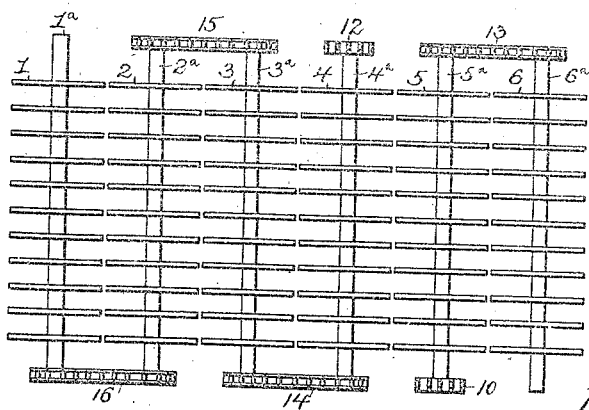
Figure 4:
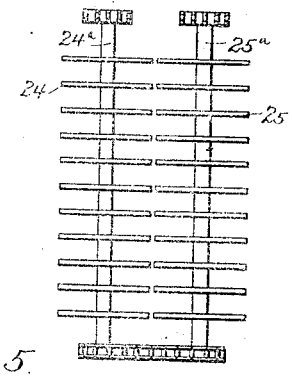
Figure 2:
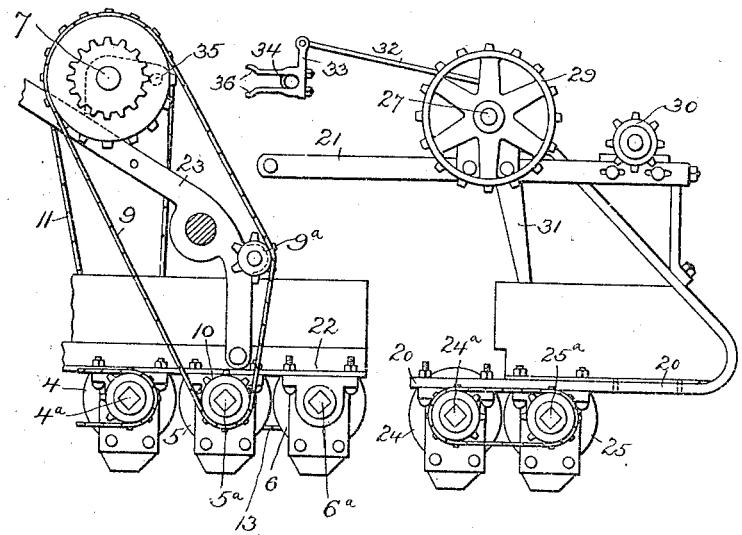
Figure 3:
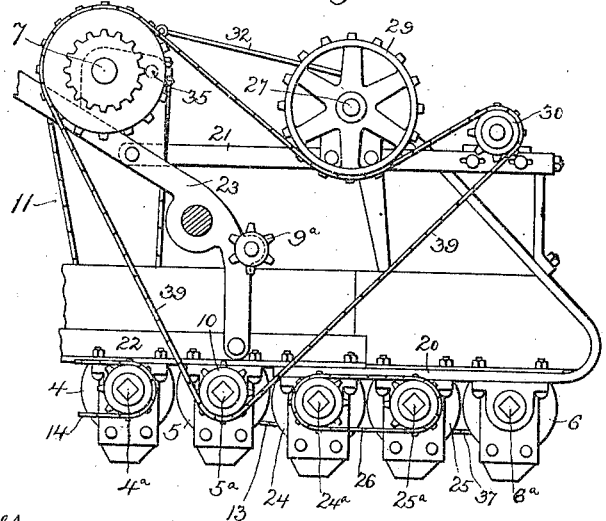

In the accompanying drawings—Figure 1 is a perspective view of the attachment constituting the subject of my invention; Fig. 2 is a view, partly in side elevation and partly in section, of the rear portion of the potato digger and of the attachment detached therefrom; Fig. 3 is a view similar to Fig. 2, but illustrating the attachment in its operative relation to the machine; Fig. 4 is a top or plan view, of a diagrammatic character, illustrating the rows of disks carried by the machine and those carried by the attachment and also illustrating the connections whereby the rows of disks are driven one from another, the parts bearing the relation to each other shown in Fig. 2, and Fig. 5 is a similar view, but illustrating the parts in the relation to each other shown in Fig. 3.

The potato digging machine has a conveyer composed of any desired number of rows of rotating disks, said rows being disposed in succession, one behind another, so that the rotating disks of each row will tend to pass on to the disks of the row behind it, the potatoes and vines removed from the ground by the digging mechanism at the front of the machine, the disks being laterally spaced in order to permit the potatoes to drop between the same, while serving to carry the mass of vines to the rear.

Figure 5:
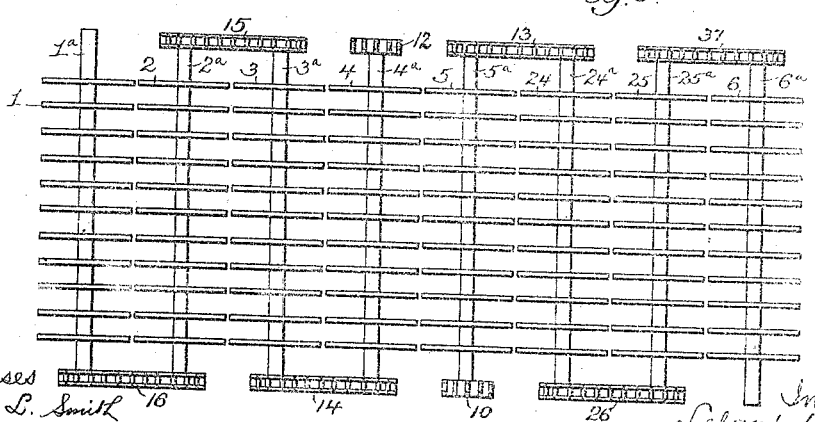

As shown in Figs. 4 and 5 I have illustrated a machine having six successive rows of disks, which I have numbered, respectively, 1, 2, 3, 4, 5 and 6, each of these rows of disks being mounted upon a shaft $1^a$, $2^a$, $3^a$, etc., and these shafts being mounted in suitable bearings secured to and depending from the fixed frame of the machine, the shafts $4^a$, $5^a$ and $6^a$ and the bearing for one end of each of these shafts being shown in Figs. 2 and 3. The machine has an elevated shaft 7 provided with sprocket wheels intended to be driven by suitable gearing (not shown) from the traction wheel or axle of the machine. One of the sprocket wheels, by means of an endless chain 9, drives a sprocket wheel 10 at one end of the shaft $5^a$, and the other, by means of an endless chain 11, drives a sprocket wheel 12 at the opposite end of the shaft $4^a$. (See Fig. 4). The shaft $5^a$, by means of an endless chain 13, drives the shaft $6^a$, the shaft $4^a$, by means of an endless chain 14, drives the shaft $3^a$, the latter, by means of an endless chain 15, drives the shaft $2^a$, and the latter, by means of an endless chain 16, drives the shaft $1^a$. The crop to be harvested may, however, be of such character that the proper separation of the potatoes will not be effected by the number of rows of rotating disks with which the machine is normally provided, and in order to meet this condition, I have devised the attachment shown in the drawings. This attachment comprises lower and upper connected side bars 20 and 21 which can be secured to the corresponding side members 22 and 23 of the main frame, the lower side bars of the attachment carrying bearings for the shafts $24^a$ and $25^a$ of two rows of disks 24 and 25, said shafts $24^a$ and $25^a$ having at one end sprocket wheels connected by an endless chain 26, so as to provide for their joint operation. The upper side bars 21 of the attachment have bearings for a transverse shaft 27, the latter having, at one end, a sprocket wheel 29 and one of said bars also has a bearing for a short shaft or spindle provided with a sprocket wheel 30. The shaft 27 is cranked at the center and pivotally mounted upon this cranked portion of the shaft is a pusher or kicker bar 31, which is also connected by a link 32 to a bracket 33 having a clamp 34 or other suitable connection whereby it may be fixedly mounted upon a transverse bar 35 on the main frame of the machine, the attachment also, by preference, having a forked brace 36 for bearing against the shaft 7, and thereby aiding in the rigid support of the bracket 33.

In order to permit of the securing of the lower side bars 20 of the attachment to the side bars 22 of the main frame, the bearings for the shaft 6ª are detached from said bars 22 and said shaft, its disks and bearings are removed from the main frame and the bearings are secured to a rearwardly extending portion of the side members 20 of the attachment, the forward ends of the side bars 20 being then fitted to the side bars 22, as shown in Fig. 3, and secured thereto by the same bolts which secure the bearings for the shaft 24ª to said bars 20. The same chain 13 which formerly connected the shafts 5ª and 6ª now suffices to connect the shafts 5ª and 24ª, as shown in Fig. 5, and an additional chain 37 is employed for connecting the shafts 25ª and 6ª. The chain 9 is removed and replaced by a chain 39, which, as shown in Fig. 3, serves to drive not only the shaft 5ª but also the shaft 27, the sprocket wheel 30 serving as an idler for this chain. The rear shaft 6ª is removed because it is provided with a sprocket wheel at one end only, and hence is not adapted to drive one of the shafts of the attachment. If it had a sprocket wheel at each end its removal would not be necessary and the bars 20 of the attachment could be attached to the bars 22 of the main frame otherwise than as shown in the drawings.

I claim:

1. The combination of a potato digging machine having a series of disk carrying shafts located one behind another and gearing for driving said shafts with an attachment also provided with a series of disk carrying shafts one behind another, means for connecting the frame members of said attachment to corresponding frame members of the machine, and gearing whereby the disk carrying shafts of said attachment are operated from a driven shaft of the main machine.

2. The combination of a potato digging machine having a series of disk carrying shafts located one behind another and gearing for driving said shafts, an attachment also provided with a series of disk carrying shafts located one behind another and with a crank shaft carrying a pivoted pusher bar, means for connecting the frame members of the attachment to corresponding frame members of the main machine, gearing for driving the disk carrying shafts of the attachment from a driven shaft of the main machine, and means for connecting the pusher bar of the attachment to a fixed member of the main machine.

3. An attachment for potato digging machines, said attachment having frame members for connection to the main frame of the machine and being provided with a plurality of disk-carrying shafts and with a crank shaft carrying a pivoted pusher bar, and means for connecting a member of the attachment to the fixed frame of the machine, said means including a bracket having a clamp for securing the same to a bar of the machine and a brace for bearing upon a shaft of said machine.

4. An attachment for potato digging machines, said attachment having frame members for being secured to the fixed frame of the machine and being provided with a plurality of disk-carrying shafts, a crank shaft, a sprocket wheel thereon, and an idler for directing the sprocket driving chain.

5. An attachment for potato digging machines, said attachment having frame members for connection with the fixed frame of the machine, and a plurality of disk-carrying shafts, said frame members being projected in the rear of said shafts for receiving the bearings of another disk-carrying shaft.

In testimony whereof, I have signed my name to this specification, in the presence of two subscribing witnesses.

LELAND WILLIS.

Witnesses:
E. E. WILSON,
HARRY SNYDER.